March 6, 1962   G. L. BABCOCK   3,024,400
SERVO CONTROL
Filed July 19, 1960
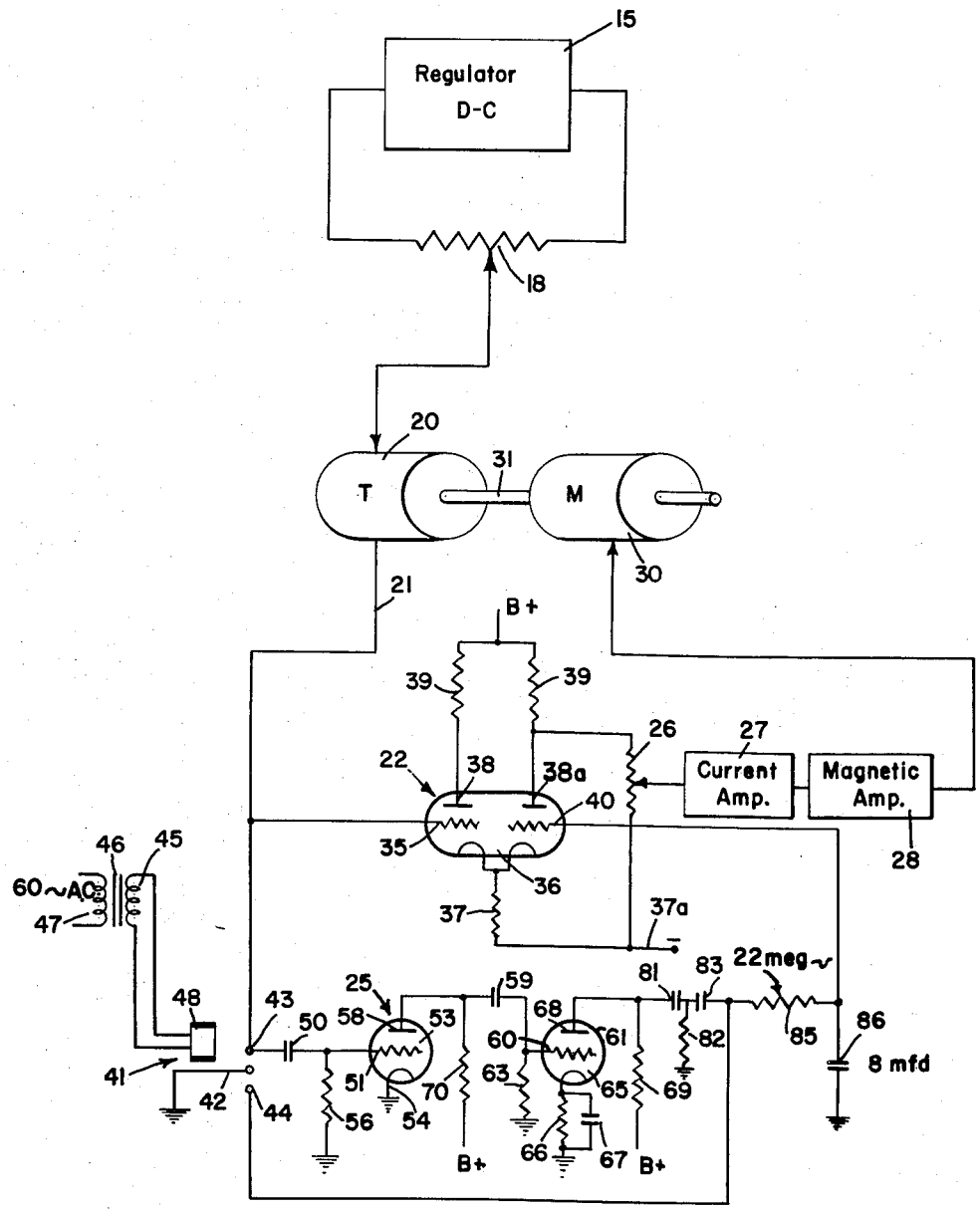
INVENTOR
Gordon L. Babcock
BY
Townsend and Townsend
attorneys

United States Patent Office 3,024,400
Patented Mar. 6, 1962

3,024,400
SERVO CONTROL
Gordon L. Babcock, Palo Alto, Calif., assignor to Knapic Electro-Physics, Inc., Palo Alto, Calif., a corporation of California
Filed July 19, 1960, Ser. No. 43,765
6 Claims. (Cl. 318—308)

This invention relates to an extremely accurate and rapid servo mechanism for controlling the speed of a motor.

In certain industrial applications it is necessary to control the speed of a motor within extremely close tolerances and speed variations must be varied within a sufficiently rapid time interval to minimize error. One such application is in the growing of crystals from a molten melt in which the seed about which the crystal is grown from the melt must be raised at a regular and precisely controlled rate. If the rate is increased or decreased even in minimal variations the end crystal product exhibits variations in diameter that render the product less acceptable from a commercial or operational standpoint.

It is accordingly a principal object of this invention to provide a motor control mechanism which will form an almost instantaneous adjustment of the speed of a motor in combination with a rapid but somewhat slower adjustment which will reflect extremely minute control variations so as to render the speed of the motor in exact and constant relation to the control.

A feature and advantage of this invention is that the broad control of the motor works with extreme rapidity so that the motor is brought within extremely close speed control relative to the control voltage and is subsequently brought into precise speed control by a circuit which within seconds brings the motor into precise control with the control voltage value.

A further object of this invention is to provide a motor controlled servo mechanism having a relatively low gain servo loop adapted to control the motor in response to the differential of voltage output from a control voltage and a feed-back voltage and a second high gain servo loop connected in parallel with said first servo loop in which the second servo loop contains a high gain amplifier having a chopper which alternately samples the input and the output of said amplifier and an integrator which converts the output of the amplifier to a constant D.C. value.

Other objects of the present invention will become apparent upon reading the following specification and referring to the accompanying drawings in which similar characters of reference represent corresponding parts in each of the several views.

In the drawings, the drawing shows a schematic view of the principal embodiment of the invention.

In the principal embodiment of the invention there is provided a highly regulated D.C. supply voltage source indicated at 15 and in which the D.C. output from regulator 15 is controlled by a potentiometer indicated at 18.

The output D.C. voltage of potentiometer 18 functions as a reference voltage for a tachometer 20. The tachometer is of the type that will produce an output voltage directly proportional to its speed of rotation.

The control or reference voltage from potentiometer 18 is connected to the output line of the tachometer in phase subtracting relationship so that the output from the tachometer on line 21 connected to the tachometer and the reference D.C. is the differential, either positive or negative, between the control voltage and the voltage that the tachometer is producing at any given instant.

The different voltage output from the tachometer is fed on line 21 simultaneously to a transient amplifier 22 and to a D.C. stabilization amplifier 25. The transient amplifier functions as a mixer to mix the signal from transient amplifier 22 and D.C. stabilization amplifier 25. The mixed signal in the form of a D.C. voltage value is fed to a magnetic amplifier 28 for direct control of motor 30. Motor 30 is connected via a common shaft 31 to drive tachometer 20. In this circuit the magnetic amplifier is biased to supply motor 30 with sufficient operating potential to normally cause the motor to operate at a substantially constant speed and is sensitive to changes of the transient and stabilization amplifiers.

A variation of the voltage on line 21 up or down from effective zero will cause an oppositely phased variation of input to magnetic amplifier 28 to cause the motor to slow down or speed up and bring the effective voltage on line 21 back to zero.

Transient amplifier 22 comprises a dual triode, the first grid 35 of which is connected directly to line 21. The two cathodes 36 are connected through a common biasing resistor 37 to a D.C. voltage on negative rail 37a which is negative with respect to ground. The two anodes 38 and 38a of the first and second sections of the tube are connected through plate load resistors 40 to a source of B-plus potential.

The output to magnetic amplifier 28 is taken off of anode 38a through potentiometer 26. The potentiometer is connected between the negative rail 37a and anode 38a with the slider being connected to obtain input for the magnetic amplifier. A current amplifier facilitates a more rapid response of the magnetic amplifier and materially assists in the reduction of the hunting effect which would be more predominant without being so driven. Potentiometer 26 is adjusted to obtain an operating system bias for the input to the magnetic amplifier circuit. Normally the adjustment would be such that the voltage on grid 40 would be at zero when the system is in equilibrium. By virtue of this adjustment, however, the system bias maintains the relative balance so that the D.C. stabilization amplifier 25 need only supply voltages which are directly necessary to cause a fluctuation of motor speed and does not need to supply bias for the input which would put an undesirable work load on the amplifier.

It can be seen, therefore, that as the grid voltage for grid 35 increases or decreases the effective conductivity between cathode 36 and anode 38 will increase or decrease correspondingly. This causes a change in the opposite cathode potential so that the plate current at anode 38a will fluctuate in accordance with the variations of grid current for grid 35. This circuit is immediately responsive to changes in the direct current potential on line 21 thus causing the magnetic amplifier to similarly respond to fluctuations of the line.

An increase of grid voltage at grid 35 will cause the magnetic amplifier to lower its output to motor 30 thus causing the tachometer to rotate at a slower speed and lower the output. As the grid voltage at 35 is decreased the input to the magnetic amplifier will increase to cause motor 30 to go faster. Thus the circuit functions as an immediately reactive servo.

In such a circuit there is the possibility of overshooting and thus causing a function common in servo mechanisms termed "hunting" where the input to motor 30 tends to drive the voltage appearing on line 21 past the zero point and into the opposite direction before the response to the magnetic amplifier is reactive to reverse. It is necessary therefore that the magnetic amplifier be of a highly reactive type in which the output and the input occur with a minimum of lag time.

Amplifier 22 has relatively low amplification but is very rapidly reactive so that transient variations of the voltage on line 21 are immediately sensed by the magnetic amplifier through the transient amplifier.

The D.C. stabilization amplifier or channel 25 functions as an electronic vernier control which is somewhat delayed from the immediate response control effected through amplifier 22. The output from the D.C. stabilization channel is applied directly to the second grid 40 of the tube of amplifier 22 and functions to also control the plate current drawn by anode 39. Thus the transient amplifier functions as an amplifier and for direct transient response to voltage changes of line 21 and functions to mix the control effected through D.C. stabilization channel 25.

The D.C. stabilization channel operates as an A.C. amplifier to avoid the problem of drift occurring in D.C. amplifiers by providing a chopper generally indicated at 41 which intermittently connects and disconnects the input to the amplifier.

The chopper comprises an armature 42 which makes contact with the input terminal 43 and alternatively with the output terminal 44. The chopper is operated through the secondary 45 of a transformer 46. The primary 47 is connected directly to a 60 cycle alternating current so that the electromagnet 48 of the chopper causes armature 42 to fluctuate between the input and output terminals 43 and 44 respectively in phase relation to the 60 cycle input.

The output terminal is connected to a coupling capacitor 50 and to the grid 51 of a first amplifying tube 53. The cathode 54 is connected directly to ground and the grid is biased by a biasing resistor 56. The output from tube 53 is taken from the anode 58 and fed through a coupling condenser 59 to the grid 60 of a second amplifying tube 61. A D.C. return resistor 63 is also connected to grid 60. The cathode 65 of tube 61 is biased by a biasing resistor 66 and a capacitor 67.

The plate 68 of tube 61 is supplied with positive potential through a load resistor and similarly anode 58 of tube 53 is supplied with the B-plus potential through a similar resistor 70.

The output from anode 68 is connected to a capacitor 81 which is connected directly to ground through D.C. return resistor 82. A second capacitor 83 is connected to capacitor 81 from which the output from the amplifier is obtained.

The purpose of providing capacitor 81 and resistor 82 is to eliminate the effect of the leakage that might be present in any coupling condenser taking the signal from tube 61. Resistor 82 will bleed off all D.C. current and capacitor 83 will see only the IR drop across resistor 82 so that the stress across capacitor 83 will be low enough to render any D.C. leakage negligible. Thus capacitor 83 will effectively pass only the alternating current.

Capacitor 83 is connected to output terminal 44 of chopper 41 and through an RC time constant circuit comprising a resistor 85 and a condenser 86 connected in series to the grid. If the value of resistor 82 is approximately 22 megohms and condenser 86, 8 mfd. there will be a time constant of approximately 176 seconds for full charging.

Output terminal 44 of chopper 41 is connected to the output terminal of capacitor 83 in such a way as to short out or ground the output from amplifier 25 during one phase condition of the amplifier. Thus the chopper functions as a phase conscious rather than polarity conscious diode and has the advantage of having no back resistance. Thus, for example, if during the time that armature 42 is in contact with the output terminal the polarity of the amplifier is positive, such signal will be grounded and during the relative negative signal the circuit will be completely open to allow the charging of condenser 86. The circuit could be arranged in the opposite condition if desired. Thus the condenser will only see the portion of the phase of a single polarity.

In the operation the voltage from potentiometer 18 is first applied to the tachometer as a control or reference. In that the tachometer is not rotating at that instant the signal to the magnetic amplifier will be at an extreme value to cause motor 30 to rotate at its maximum rate. As motor 30 builds up speed a cancelling voltage is built up on line 21 which will rise in cancelling relationship to the control voltage. As this happens the signal on grid 35 will shift thus bringing down the control to magnetic amplifier 28 to a point of equilibrium.

The magnetic amplifier is substantially immediately responsive to input changes so that there is a minimum of hunting or overshooting. At the same time D.C. stabilization amplifier 25 which has an amplification of about 5,000 times the input signal will cause condenser 86 to charge. The voltage on grid 40 will therefore be regulated after a slight time delay by the more precise control afforded by the stabilization amplifier. It can be seen that as amplifier 22 brings the circuit into equilibrium the error sensed by amplifier 28 will materially lessen so that equalization can be obtained.

The purpose of establishing the time delay through the RC circuit of resistor 85 and condenser 86 is to prevent oscillation which may occur in the absence of the delay.

The magnetic amplifier effectuates an immediate control for motor 30 and the control afforded by the mixing and amplifying action of amplifier 22. The vernier control of amplifier 25 affords sufficient stabilization for magnetic amplifier 28 to maintain the input to the amplifier within the stabilization ranges needed for such an amplifier.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a servomechanism for controlling the speed of a motor in precise response to the value of a control voltage the combination of a motor of the type which will have a rate of speed proportionate to the input voltage, a tachometer of the type which will produce voltage output proportional to its rate of rotation, means mechanically coupling said tachometer in driven relationship with said motor, a magnetic amplifier connected to supply said motor with driving voltage, a source of highly regulated direct current control voltage, first and second amplifiers, means connecting said control voltage source and the voltage output of said tachometer in voltage cancelling relationship to control said first and second amplifiers, and means to mix the output of said first and second amplifiers and connect the output to control said magnetic amplifier, said first amplifier operative to vary the input to said magnetic amplifier in direct response to changes in the differential between the control voltage and the voltage output from said tachometer, said second amplifier operative to control said magnetic amplifier in delayed response to the differential between said control voltage and the output of said tachometer.

2. A device according to claim 1 and wherein said second amplifier is constructed and arranged to amplify its input signal many times greater than said first amplifier.

3. In a servomechanism for controlling the speed of a motor in precise response to the value of a variable control voltage of the type having a motor having a rate of speed proportionate to its input voltage, a tachometer coupled to the motor which will produce an output voltage proportional to its rate of rotation the improvement comprising a source of highly regulated direct current control voltage, first and second amplifiers having inputs connected in voltage cancelling relationships to the output of said tachometer and said direct current control voltage, said first amplifier being a direct current amplifier, said second amplifier having chopper means to convert the input to said amplifier to periodic pulses and to disable the input of said amplifier in the interim between pulses, an RC time constant circuit connected to the output of said second amplifier, a magnetic amplifier connected to control the motor, and means to connect the output of said first and second amplifiers to control said magnetic amplifier.

4. In a servomechanism for controlling the speed of a motor in precise response to the value of a variable control voltage of the type having a motor having a rate of speed proportionate to its input voltage, a tachometer coupled to the motor which will produce an output voltage proportional to its rate of rotation the improvement comprising a source of highly regulated direct current control voltage, first and second amplifiers having inputs connected in voltage cancelling relationships to the output of said tachometer and said direct current control voltage, said first amplifier being a low gain direct current amplifier, said second amplifier being a high gain direct current amplifier, chopper means to convert the input to said pulse amplifier to periodic pulses and to disable the input of said amplifier to the interim between pulses, and RC time constant circuit connected to the output of said second amplifier to integrate the output of said second amplifier, a magnetic amplifier connected to control the motor, and mixer means to mix the output of said first and second amplifiers and connect the output to the input of said magnetic amplifier.

5. In a servomechanism for controlling the speed of a motor in precise response to the value of a variable control voltage of the type having a motor having a rate of speed proportionate to its input voltage, a tachometer coupled to the motor which will produce an output voltage proportional to its rate of rotation the improvement comprising a source of highly regulated direct current control voltage, first and second amplifiers having inputs connected in voltage cancelling relationships to the output of said tachometer and said direct current control voltage, said first amplifier being a low gain direct current amplifier, said second amplifier being a high gain direct current amplifier, chopper means connected to the input and the output of said second amplifier to alternatively and sequentially ground the input and the output of said second amplifier, an RC time constant integration circuit connected to the output of said second amplifier to integrate the output to provide a constant fluctuating D.C. output value, mixer means comprising said first amplifier to mix the output of said first and second amplifiers, and a magnetic amplifier to control said motor, said magnetic amplifier being connected to said mixer means.

6. In a servomechanism for controlling the speed of a motor in precise response to the value of a control voltage the combination of a motor of the type which will have a rate of speed proportionate to the input voltage, a tachometer of the type which will produce voltage output proportional to its rate of rotation, means mechanically coupling said tachometer in driven relationship with said motor, a magnetic amplifier connected to supply said motor with driving voltage, a source of highly regulated direct current control voltage, first and second amplifiers, means connecting said control voltage source and the voltage output of said tachometer in voltage cancelling relationship to control said first and second amplifiers, means to mix the output of said first and second amplifiers, current amplifying means connected to said mixing means, the output of said current amplifying means being connected to control said magnetic amplifier, said first amplifier operative to vary the input to said magnetic amplifier in direct response to changes in the differential between the control voltage and the voltage output from said tachometer, said second amplifier operative to control said magnetic amplifier in delayed response to the differential between said control voltage and the output of said tachometer, and system bias means connected between said current amplifier and said mixing means to bias the input to said magnetic amplifier to maintain the motor in the state of equilibrium during the periods when the output from the second amplifier is at an effective null.

No references cited.